United States Patent [19]

Chang et al.

[11] Patent Number: 5,918,278
[45] Date of Patent: Jun. 29, 1999

[54] RAINGAGE FOR PROVIDING IMPROVED MEASUREMENT OF LOCAL RAINFALL

[76] Inventors: Mingteh Chang, Box 6109, SFA Station, College of Forestry, Stephen F. Austin University, Nacogdoches, Tex. 75962; Lee A. Flannery, 4233 U.S. Hwy. 80 West, Marshall, Tex. 75670

[21] Appl. No.: 09/031,406

[22] Filed: Feb. 26, 1998

[51] Int. Cl.$^6$ .................................................... G01W 1/00
[52] U.S. Cl. .................................... 73/170.21; 73/170.17
[58] Field of Search ............................. 73/170.17, 170.21

[56] References Cited

U.S. PATENT DOCUMENTS

| | | | |
|---|---|---|---|
| 2,507,206 | 5/1950 | Hunn et al. | 73/170.17 |
| 5,394,748 | 3/1995 | McCarthy | 73/170.21 X |
| 5,571,963 | 11/1996 | Balchin et al. | 73/170.21 |

FOREIGN PATENT DOCUMENTS

| | | | |
|---|---|---|---|
| 403233393 | 10/1991 | Japan | 73/170.21 |

OTHER PUBLICATIONS

Leonard, Raymond E. and Reinhart, Kenneth G., Northeastern Forest Experiment Station, *U.S. Forest Service Research Note NE–6*, 1963, pp. 1–4.

Chang, Mingteh and Lee, Richard, Representativeness of Watershed Precipitation Samples, *West Virginia University Bulletin*, Mar. 1975, Series 75, No. 9–7.

Golubev, V.S., On the Problem of Standard Conditions for Precipitation Gauge Installation, *Workshop on the Correction of Precipitation Measurements*, Apr., 1985, pp. 57–59.

Sevruk, Boris and Zahlavova, Lubica, Statistics for Precipitation Gauge Site Exposure Changes, *Swiss Federal Institute of Technology*, 1992, pp. 383–386.

Nipher, Francis E., On the Determination of the True Rainfall by Elevated Gauges, *Proceedings of the American Association for the Advancement of Science*, 1878, vol. 27, pp. 103–108.

Alter, J. Cecil, Shielded Storage Precipitation Gages, *Monthly Weather Review*, Jul., 1937, vol. 65, No. 7, pp. 262–265.

Warnick, C.C., Experiments with Windshields for Precipitation Gages, *Transactions, American Geophysical Union*, Jun., 1953, vol. 34, No. 3, pp. 379–388.

Lapin, M. and Samaj, F., Methodics of Corrections of Systematic Errors of Atmospheric Precipitation Measurements in CSSR, *International Workshop on Precipitation Measurement*, 1989, pp. 187–191.

Hamilton, Everett L. and Reimann, Lyle F., Simplified Method of Sampling Rainfall on the San Dimas Experimental Forest, *Technical Paper*, Oct., 1958, No. 26.

Koschmieder, Prof. Dr. H, Methods and Results of Definite Rain Measurements, *Monthly Weather Review*, Jan., 1934, pp. 5–8.

De Bruin, H.A.R., Results of the International Comparison of Rain Gauges with a Reference Pit Gauge, Part A: Basic Stations, *Workshop on the Correction of Precipitation Measurements*, Apr., 1985, pp. 97–99.

Hamon, W. Russell, Chapter 4—Reynolds Creek, Idaho, *Agricultural Research Service Precipitation Facilities and Related Studies*, Jun. 1971, pp. 25–35.

(List continued on next page.)

*Primary Examiner*—Elizabeth L. Dougherty
*Attorney, Agent, or Firm*—Frohwitter

[57] ABSTRACT

Global and semi-global raingage orifices are provided which are suitable for use in conjunction with widely accepted standard gages to more accurately measure the local accumulation of precipitation, regardless of wind direction and speed during rainfall. The gage may be installed with its orifice either at ground level or a short distance above the surface. The gage orifices can be mounted on top of standard raingages, and measurements derived according to existing standards. The gage orifices are simple in design, easy to operate, and inexpensive.

6 Claims, 17 Drawing Sheets

Model 1: Global raingage orifice with cylinders (side view).

OTHER PUBLICATIONS

Larson, Lee W. and Peck, Eugene L., Accuracy of Precipitation Measurements for Hydrologic Modeling, *Water Resources Research,* Aug., 1974, vol. 10. No. 4, pp. 857–863.

Rawls, Walter J. et al., Comparison of Precipitation Gage Catches With a Modified Alter and a Rigid Alter Type Windshield, *Water Resources Research,* Jun., 1975, vol. 11, No. 3, pp. 415–417.

Chang, Mingteh and Lee, Richard, Do Forests Increase Precipitation?, *West Virginia Forestry Notes,* Sep., 1974, No. 2, pp. 16–20.

Allerup, P., Statistical Models and Leading Factors for Correction of Aerodynamic errors i Precipitation Measurements, *Workshop on the Correction of Precipitation Measurements,* Apr., 1985, pp. 205–209.

Gronowski, T.V., Correction of Precipitation Measurements for Wind Induced Losses: A Case Study, *International Workshop on Precipitation Measurement,* 1989, pp. 181–182.

McGuinness, J.L., A Comparison of Lysimeter Catch and Rain Gage Catch, *Agricultural Research Service,* Oct., 1966, pp. 1–9.

Morgan, D.L. and Lourence, F.J., Comparison Between Rain Gage and Lysimeter Measurements, *Water Resources Research,* Jun., 1969, vol. 5, No. 3, pp. 724–728.

Hamilton, E.L., Rainfall Sampling on Rugged Terrain, *Technical Bulletin No. 1096,* Dec., 1954, pp. 1–41.

Kurtyka, John C., Precipitation Measurements Study, *Report of Investigation No. 20,* 1953, p. 20.

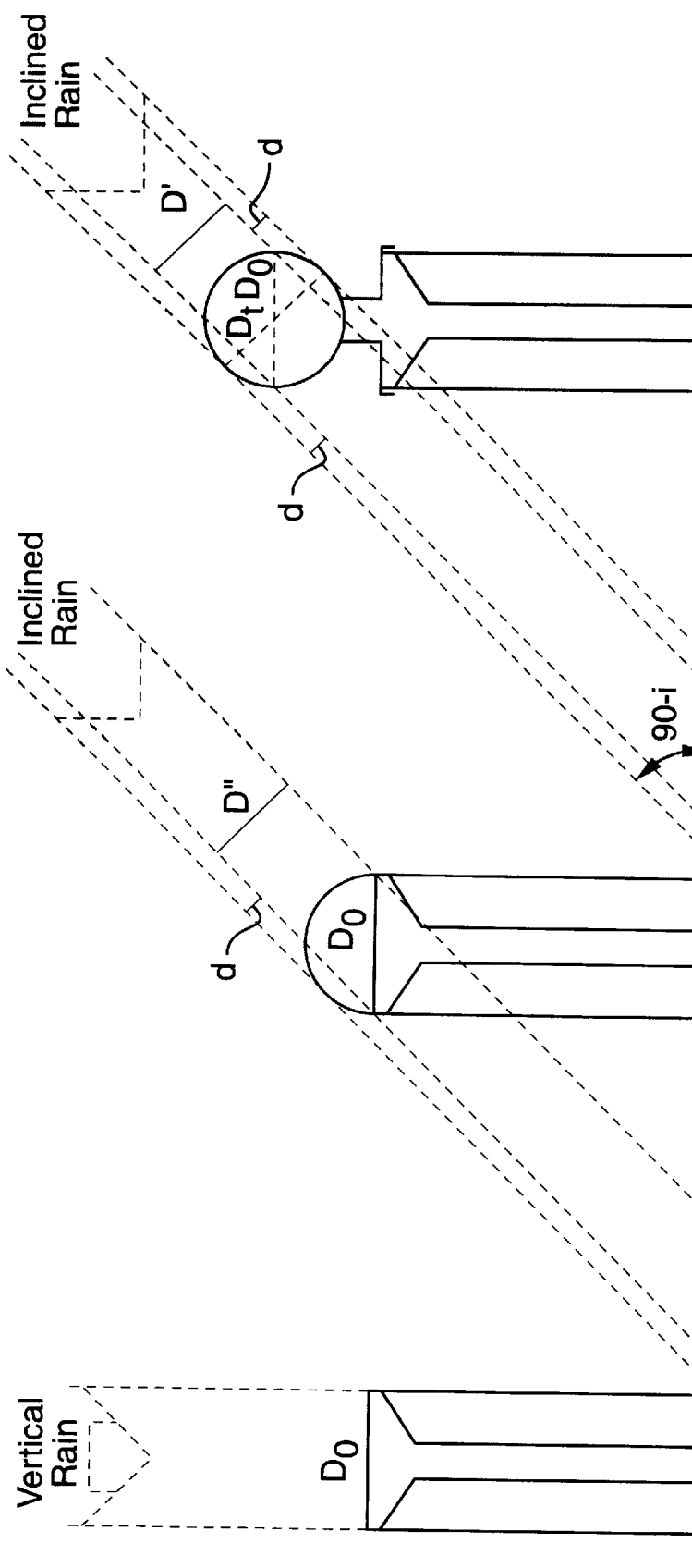
Figure 1. Measurement errors due to wind effects on (A): standard gage, (B): semi-global gage, and (C): global gage. (Note: $D_0$ = standard gage orifice, $D'$ = catch by standard gage for inclined rains or effective diameter, $D''$ = catch by semi-global gage, $D_t$ = catch by global gage = $D_0$, d = catch deficiency, i = angle of raindrop inclination).

Model 1: Global raingage orifice with cylinders (side view).

Model 1: Global raingage orifice with cylinders (top view).

Model 1: Global raingage orifice with cylinders (dimensions).

Model 1: Global raingage orifice with cylinders (pattern layout).

Model 2: Global raingage orifice with vanes (side view).

Model 2: Global raingage orifice with vanes (top view).

Model 2: Global raingage orifice with vanes (dimensions).

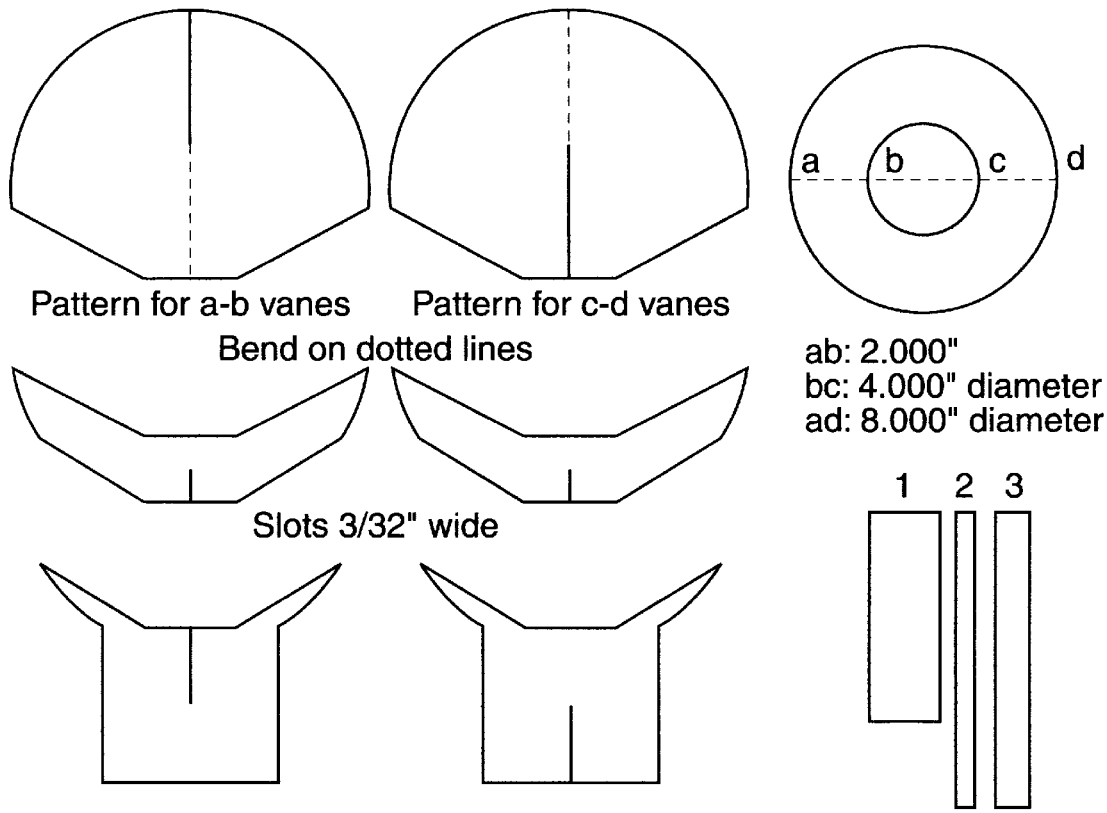
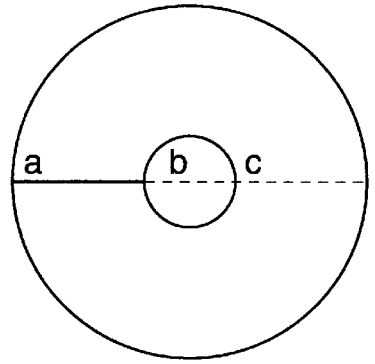
Model 2: Global raingage orifice with vanes (pattern layout).
Figure 3d

Model 3: Semi-global raingage orifice with cylinders (side view).

Model 3: semi-global rain gage orifice with cylinders (top view).

Model 3: semi-global raingage orifice with cylinders (dimensions).

Model 3: semi-global raingage orifice with cylinders (pattern layout).

Model 4: semi-global raingage orifice with vanes and cylinders (side view).

Model 4: semi-global raingage orifice with vanes and cylinders (top view).

Model 4: semi-global raingage orifice with vanes and cylinders (dimensions).

Model 4: Semi-global raingage orifice with vanes and cylinders (pattern layout).

RAINGAGE FOR PROVIDING IMPROVED MEASUREMENT OF LOCAL RAINFALL

STATEMENT REGARDING FEDERAL GOVERNMENT INTERESTS

The present invention was made with partial government support under contracts identified as McIntire-Stennis (Texy—107), awarded by the Department of Agriculture. The United States Government may therefore retain certain rights to the invention.

BACKGROUND OF THE INVENTION

There are many different types of raingages in use around the world today, the basic design being an open-topped cylindrical vessel standing substantially upright on the ground. The orifice of the vessel serves as a receiver for rain, with water falling into the orifice being transmitted into the vessel for storage and measurement.

For example, the United States National Weather Service (USNWS) standard raingage for measuring falling rainfall consists of an open-topped cylinder with an 8-inch wide orifice for receiving rainfall, a funnel to direct water from the orifice receiver into a measuring tube, and a storage vessel to catch water overflowing from the tube. The measuring tube has a cross-sectional area of approximately $\frac{1}{10}$ the width of the storage vessel's orifice. Thus, 0.01 measured inches of rain will be 0.1 inches deep in the measuring tube as read directly from a calibrated measuring stick. The measuring tube is 20 inches in height and holds exactly 2 inches of rain. Any additional rainfall will flow into the outer storage vessel (see FIG. 1a). The gage is used in a substantially upright, vertical position, with the orifice being about a meter or less above the ground.

The USNWS standard gage measures rainfall by quantifying the volume of water falling into the raingage orifice in a downward vertical trajectory. However, the air is generally not calm during stormy weather, and the presence of a raingage on the ground interferes with local wind movement, distorts the local wind field, and creates eddies and turbulence around the gage orifice and its immediate surroundings. The local air disruption causes some of the raindrops which would otherwise fall into the gage to instead strike the gage at inclined angles, thus rendering the effective orifice catch size smaller than its actual dimensions. As a consequence, point precipitation measurement is always deficient when evaluated with respect to the actual incidence of local precipitation.

Errors in precipitation measurement due to, for example, the raingage being unlevel, the color of the gage, water splashing out of the gage's orifice, evaporation, and/or adhesion of the water to the walls of the gage, are generally less than ±1% each, but local wind effects can cause measuring errors as large as from about 5% to about 80%. The water catch deficiency due to wind effects is a combined function of both the horizontal wind speed and the intensity of the rainfall. As rainfall intensity decreases, raindrop diameters decrease and the terminal velocities of individual raindrops decrease, while angles of raindrop inclination increase for a given wind speed. Thus, negative wind effects on measured precipitation are greater for light storms than for heavy storms.

There have been many studies conducted to improve precipitation measurements. Techniques and devices suggested for improvements include proper measuring site selection (Leonard and Reinhart, 1963; Chang and Lee, 1975; Golubev, 1985; Sevruk and Zahlavova, 1992); the use of shielded gages (Nipher, 1878; Alter, 1937; Warnick, 1953; Lapin and Samaj, 1989), tilted gages, (Hamilton and Reimann, 1958), pit gages (Koschmeider, 1934; De Bruin, 1985) and dual gages (Hamon, 1971; Larson and Peck, 1974; Rawls et al., 1975); computational corrections for wind effects (Chang and Lee, 1974; Chang and Lee, 1975; Allerup, 1985; Gronowski, 1989), and the use of lysimeters (McGuiness, 1966; Morgan and Lourence, 1969) and vectopluviometers (Hamilton, 1954). Each of these gages and measuring techniques address the problem of wind effects on precipitation measurement, and purport to reduce the effects of wind on the accumulation of precipitation to a minimal level. Each of these approaches, however, has proven deficient in practice.

For example, the pit gage, or so-called sunken gage, is a standard gage installed in a conical pit of 1–2 m. in diameter, with an orifice located at ground level. Since wind speed increases with height above the ground, pit gages are probably the most accurate in point precipitation measurements. They are generally accepted by those of skill in the art to be the least biased and truest means of measuring local precipitation, and are frequently used as a reference gage for calibrating other types of gages. However, pit gages have proven to be wholly inadequate for measuring snowfall, are difficult and expensive to use for large-scale applications, and are easily interfered with by litter, animals, falling leaves and other orifice blocking materials.

Since wind fields behave in a vector-like manner, they change speed and direction with respect to time and space. The great variation of wind patterns and speeds renders each of the known techniques and methods discussed above scientifically unacceptable (ie., the margins of measuring error are unacceptably high), and improvements thereto are generally found to be minor or insignificant in practice. Therefore, the effects of wind dynamics on precipitation measurement are still a major concern in modem precipitation studies.

BRIEF SUMMARY OF THE INVENTION

To overcome the problems discussed above, a variety of global and semi-global raingage orifices within the scope of the present invention are provided which are suitable for modifying the USNWS standard gage and other less common gages in use today. Gages with global orifices will catch rain with an effective diameter always equal to the actual diameter of the globe, regardless of wind speed and direction. The semi-global orifices, to be used side by side with a standard gage, will correct approximately 50% of the catch deficiency of the standard USNWS gage.

The measuring accuracy of gages equipped with global and semi-global orifices was tested against a standard gage and a pit gage at the Stephen F. Austin Experimental Forest near Nacogdoches, Tex. over a period of 21 months from July 1995 to March 1997. During this time, rainfall measurements were taken for a total of 115 rainstorms. The results show that the two gages with global orifices consistently caught more rainfall than the standard USNWS gage, with the average increase in contained, measured precipitation ranging from about 9.24% to about 9.77%. Compared to the pit gage, the deficiency in catch for the global gages ranged from about −1.24% to about 2.61%, while the deficiency for the USNWS standard gage was around −10.0% (see Table 1 below).

TABLE 1

RAINFALL CATCH (IN INCHES) FOR STANDARD GAGES EQUIPPED WITH A GLOBAL ORIFICE COMPARED WITH A USNWS STANDARD GAGE AND A PIT GAGE

| Statistics | Global Gage | | Semi-Global Gages | | Standard Gage | Pit Gage |
| --- | --- | --- | --- | --- | --- | --- |
| | Model 1 | Model 2 | Model 3 | Model 4 | | |
| # of Storms | 115 | 115 | 115 | 115 | 115 | 115 |
| Total Rainfall | 82.69 | 81.56 | 85.76 | 87.23 | 75.36 | 83.74 |
| Mean | 0.719 | 0.709 | 0.746 | 0.759 | 0.655 | 0.728 |
| Stand. Dev. | 0.796 | 0.787 | 0.820 | 0.826 | 0.722 | 0.801 |
| Maximum | 3.95 | 4.02 | 3.93 | 3.92 | 3.73 | 4.10 |
| Minimum | 0.01 | 0.01 | 0.01 | 0.01 | 0.01 | 0.00 |
| vs. Standard Gage | 9.77% | 8.24% | 13.89% | 15.88% | 0.00% | 11.15% |
| vs. Pit Gage | −1.24% | −2.16% | 2.47% | 4.26% | −10.03% | 0.00% |

Notes: Model 1 = Global gage with cylinders; Model 2 = Global gage with vanes, Model 3 = Semi-global gage with cylinders, Model 4 = Semi-global gage with vanes and cylinders.

Theoretically, the global gages should reduce the effects of wind fields on rainfall catch to a minimal level. The above-described experimental field tests prove the theory is valid. The global orifices are simpler and more effective in reducing deleterious wind effects than any device or method for catching and measuring rain known today. The orifices are inexpensive, easy to operate, and capable of large scale applications. Also, the orifices are particularly effective when used in conjunction with existing USNWS standard raingages. When combined with the present invention, the standard gages require no modification, and no changes in the existing methodology for measuring rainfall are recorded are necessary.

BRIEF DESCRIPTION OF THE DRAWINGS

Referring now to the accompanying drawing sheets,

FIG. 1a shows a USNWS standard raingage as presently known to those of ordinary skill in the art;

FIG. 1b shows a raingage equipped with a semi-global orifice, and the increased angle of inclination for which falling rain may be captured according to an aspect of the present invention;

FIG. 1c shows a raingage equipped with a global orifice, and the increased angle of inclination for which falling rain may be captured according to an aspect of the present invention;

FIG. 3d is a pattern layout of a global raingage orifice comprising a plurality of vanes according to the present invention;

DETAILED DESCRIPTION OF THE INVENTION

To accomplish the objects of the invention, there is herein provided a variety of global raingage orifices and semi-global raingage orifices suitable for retrofitting the previously known USNWS standard gage.

Since local wind fields cause the effective orifice of a raingage to function as if smaller than its actual size, a gage orifice is provided wherein a portion of the orifice always faces the incoming direction of raindrops in order to keep the effective orifice catch size equal to the orifice's actual dimensions. This can be done only if the orifice of a raingage is global or semi-global in shape. A global orifice will always have the same effective orifice size regardless of whether the air is calm or the local wind field displays varying directions and speeds.

When used in conjunction with a USNWS standard measuring gage, the global orifices will always catch rain with an effective diameter equal to 8 inches regardless of wind speed and direction. As depicted in FIG. 1c, irrespective of the angle of raindrop inclination or the direction rainfall is coming from, the effective size of the orifice, and therefore the area of catch, will always be the same.

The semi-global orifices comprise only the upper half of a water globe. Thus, they improve the catch deficiency of the standard gage by about 50%. The semi-global gages should be installed side-by-side with the standard gage for calculating relative catch deficiencies and consequently making computational corrections to catches by the standard gage. Continued use of the USNWS standard gage achieves the major advantage of allowing current rainfall measurements to be directly compared with past records for long-term hydroclimatological study by meteorologists and hydroclimatologists.

DETAILED DESCRIPTION OF THE DRAWINGS

Figure 2A:
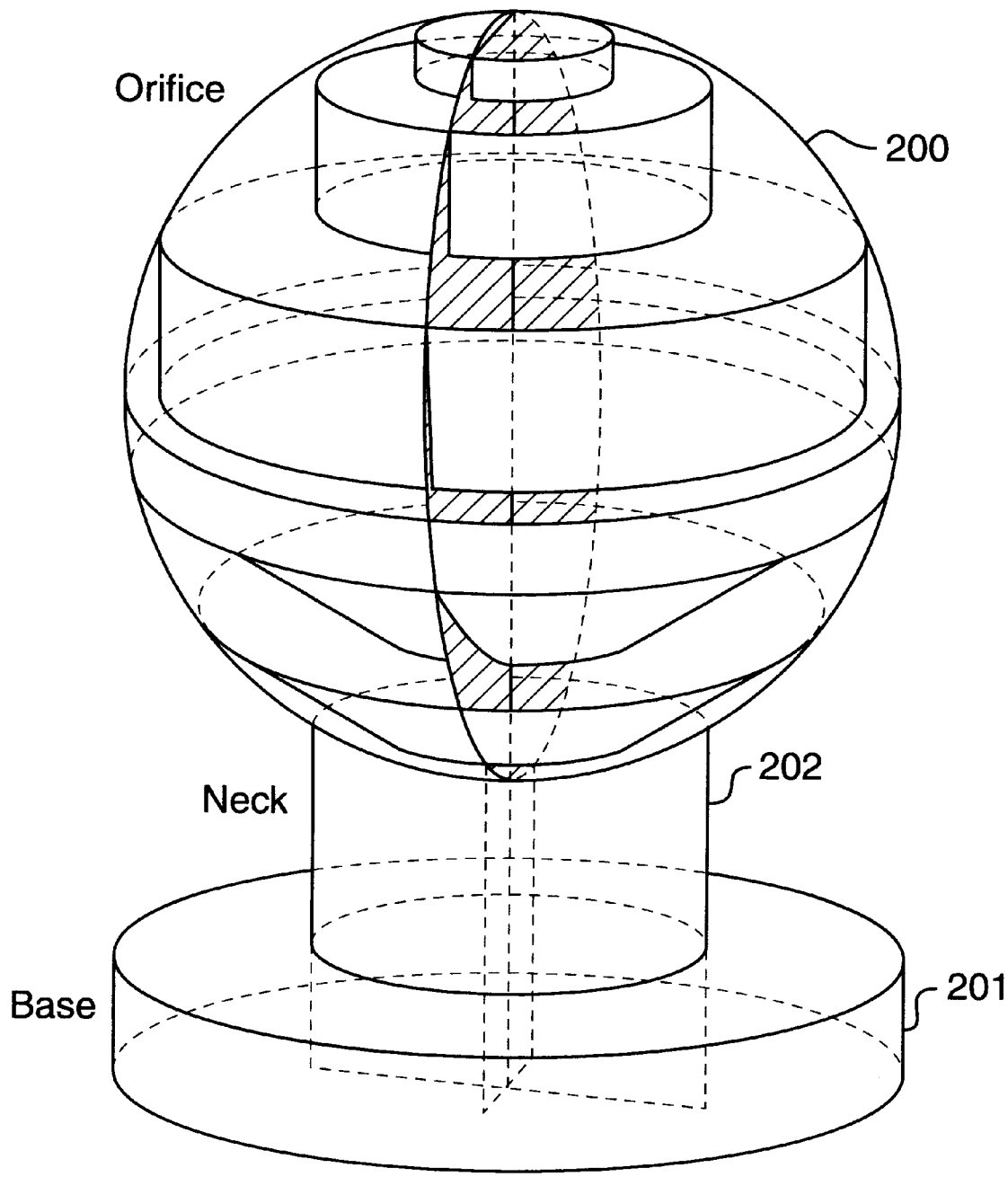
FIG. 2a is a side view of a global raingage orifice comprising a plurality of cylinders according to the present invention.

Referring now to FIG. 2a, a global raingage orifice according to one aspect of the invention is provided comprising: a spherical orifice 200 for catching falling raindrops, a base 201 for mounting the spherical orifice 200 in the existing orifice of a standard raingage (not shown), and a neck 202 for connecting the spherical orifice 200 and the base 201 together. Rainfall caught by the spherical orifice 200 is passed through the neck 202, drained through the standard orifice, and poured into a calibrated measuring tube for measurement as is well known to those of skill in the art. In a particularly preferred embodiment, the neck 202 and the base 201 are soldered together to form a single integral piece, while the spherical orifice 200 is not soldered and can therefore be disconnected from the neck 202.

Figure 2B:
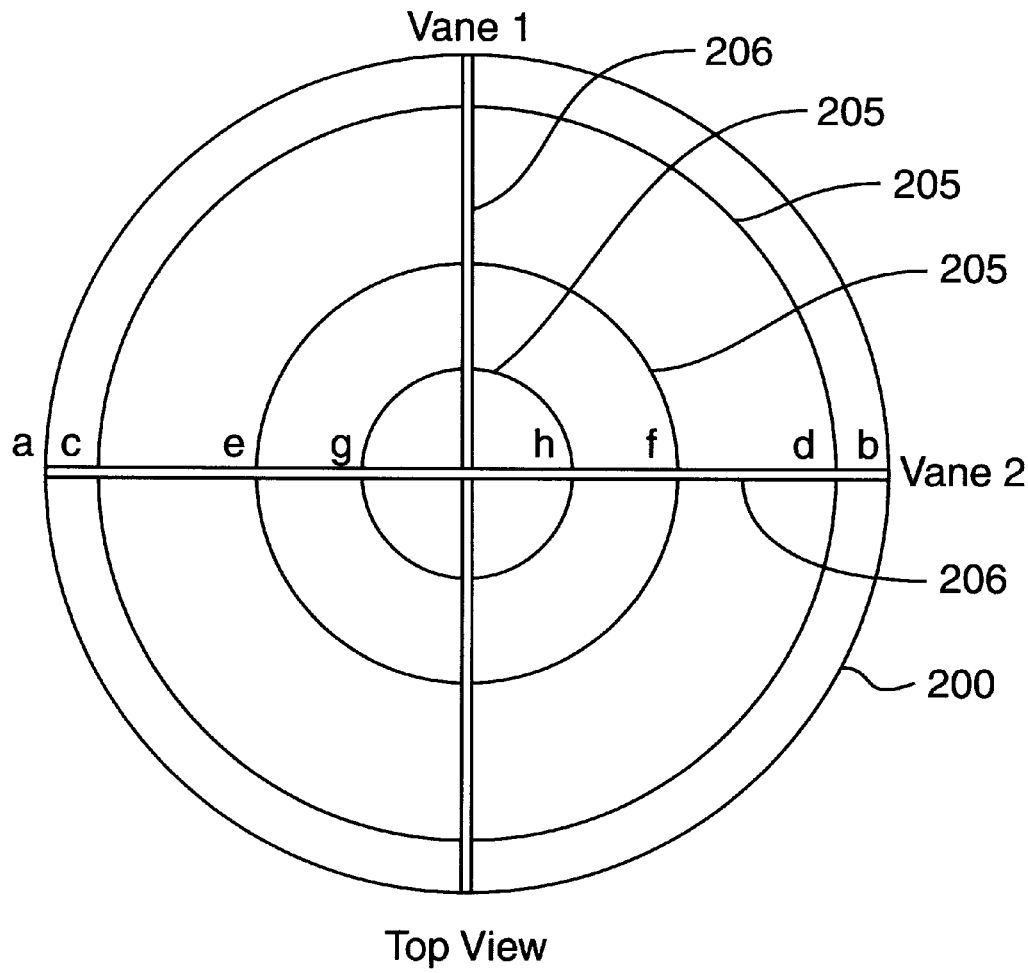
FIG. 2b is a top view of a global raingage orifice comprising a plurality of cylinders according to the present invention.
Figure 2C:
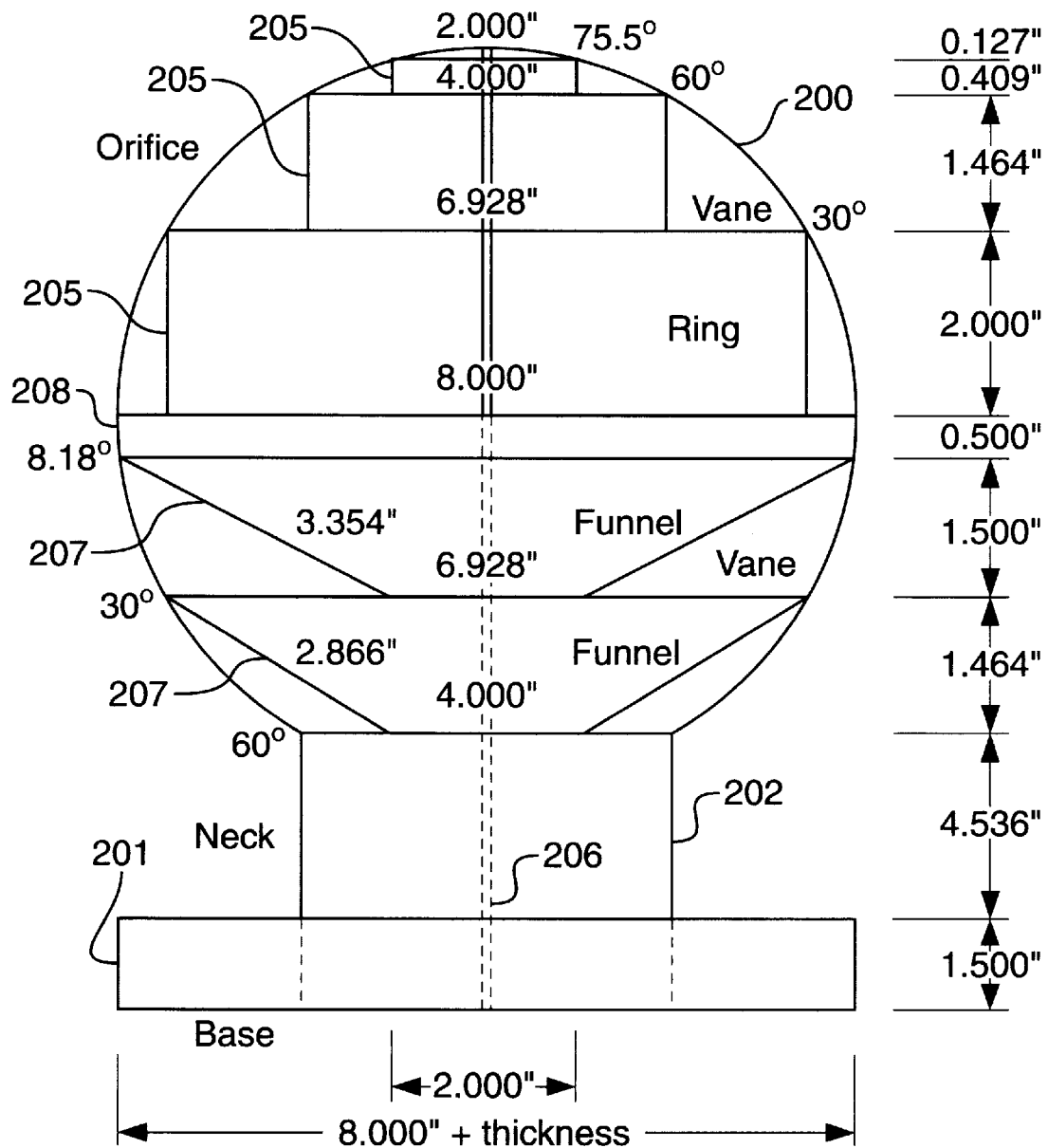
FIG. 2c is a dimensional plan of a global raingage orifice comprising a plurality of cylinders according to the present invention.

As seen in the exemplary embodiment depicted in FIGS. 2b and 2c, the spherical orifice 200 further comprises: three concentric cylinders 205 located in the upper hemisphere of orifice 200, two interlocking vanes 206 disposed vertically and perpendicularly to one another, and two funnels 207 located in the lower hemisphere of orifice 200. The upper edges of the three cylinders 205 are centrally located at around 30, 60 and 75 degrees upward of the horizontal, equatorial center 208 of the spherical orifice 200. The two perpendicular vanes 206 serve as supports for the three cylinders 205 and the two funnels 207. The two funnels 207 are located around 0.5 inches (1.27 cm) and around 2 inches (5.08 cm), respectively, below the 8 inch (20.32 cm) diameter horizontal equator of the orifice 200. The vanes 206 taper to around 4 inches (10.16 cm) across, still interlocking at the center, and extend down through the neck 202 into a separate base piece 201, allowing for partial disassembly. The top edge of the rim of the upper funnel 207 is about 8.18° below the horizontal center 208, while the top edges of the lower funnel 207 and the neck 202 are around 30° and 60° below the horizon 208, respectively.

Figure 2D:
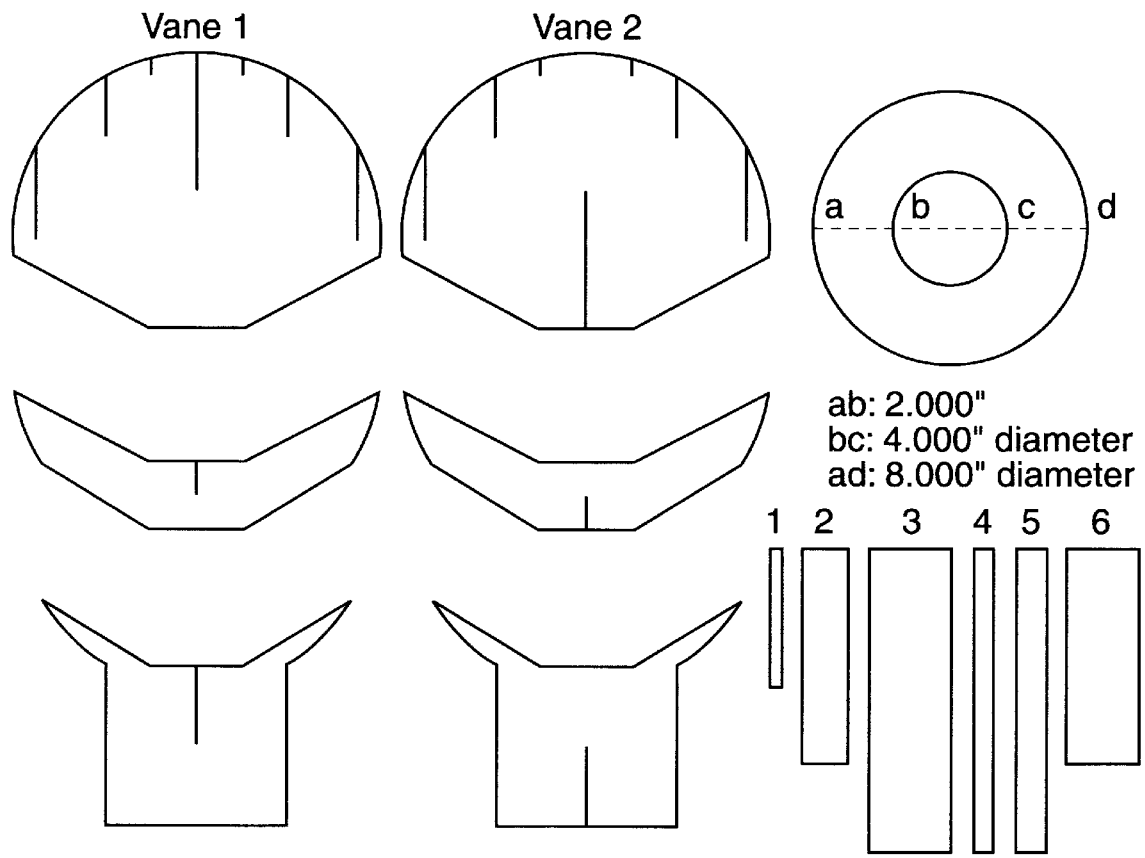
FIG. 2d is a pattern layout of a global raingage orifice comprising a plurality of cylinders according to the present invention.

The neck 202 has a diameter of approximately 4 inches (10.16 cm), a cylindrical height of around 6 inches (15.24 cm), and is connected to the base piece 201. Suitable for mounting on top of a standard raingage, the base 201 further comprises a platform to assure the spherical orifice 200 is the only path for catching falling rainwater. Exemplary dimensions and a pattern layout of the embodiment may be found in FIG. 2d.

Figure 3A:
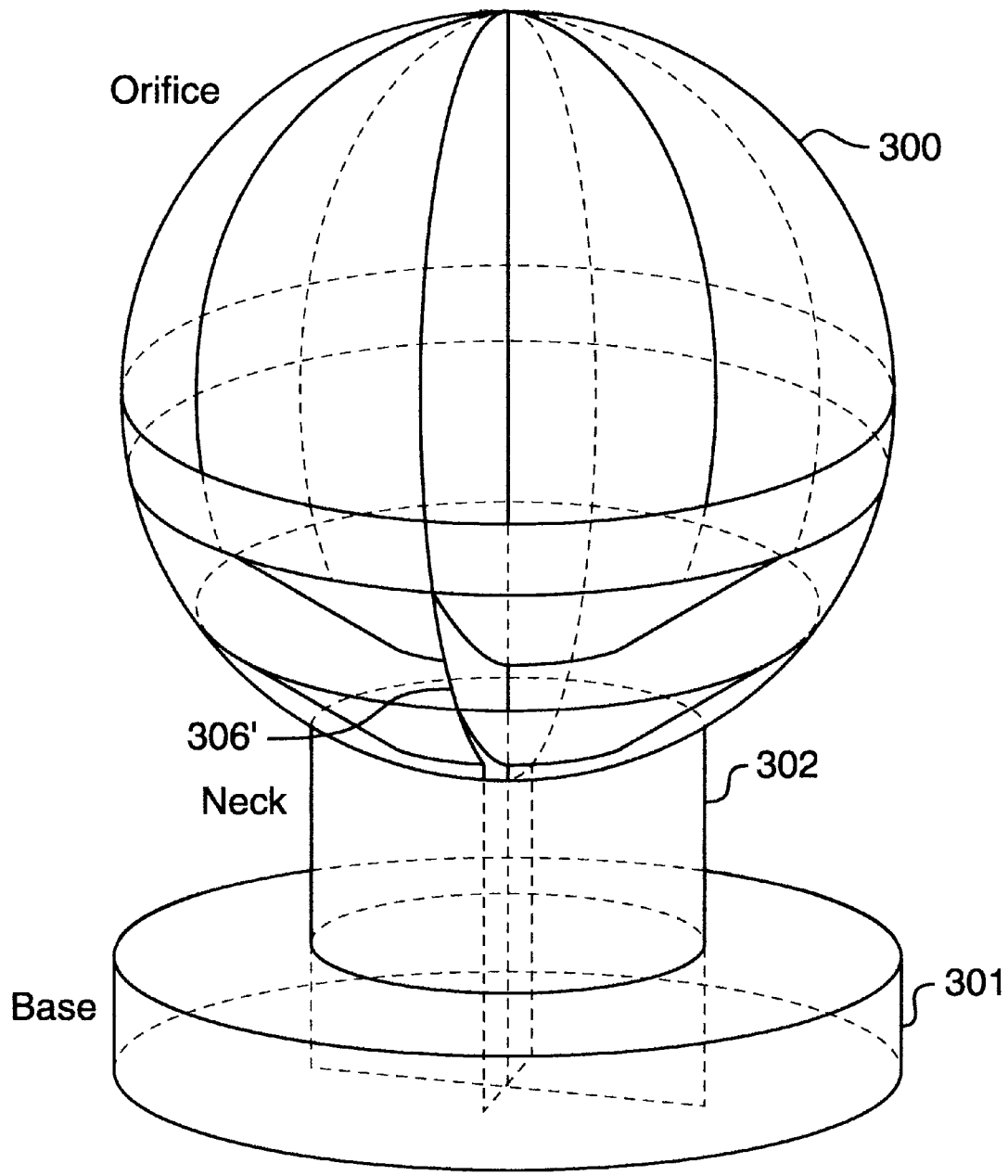
FIG. 3a is a side view of a global raingage orifice comprising a plurality of vanes according to the present invention.
Figure 3B:
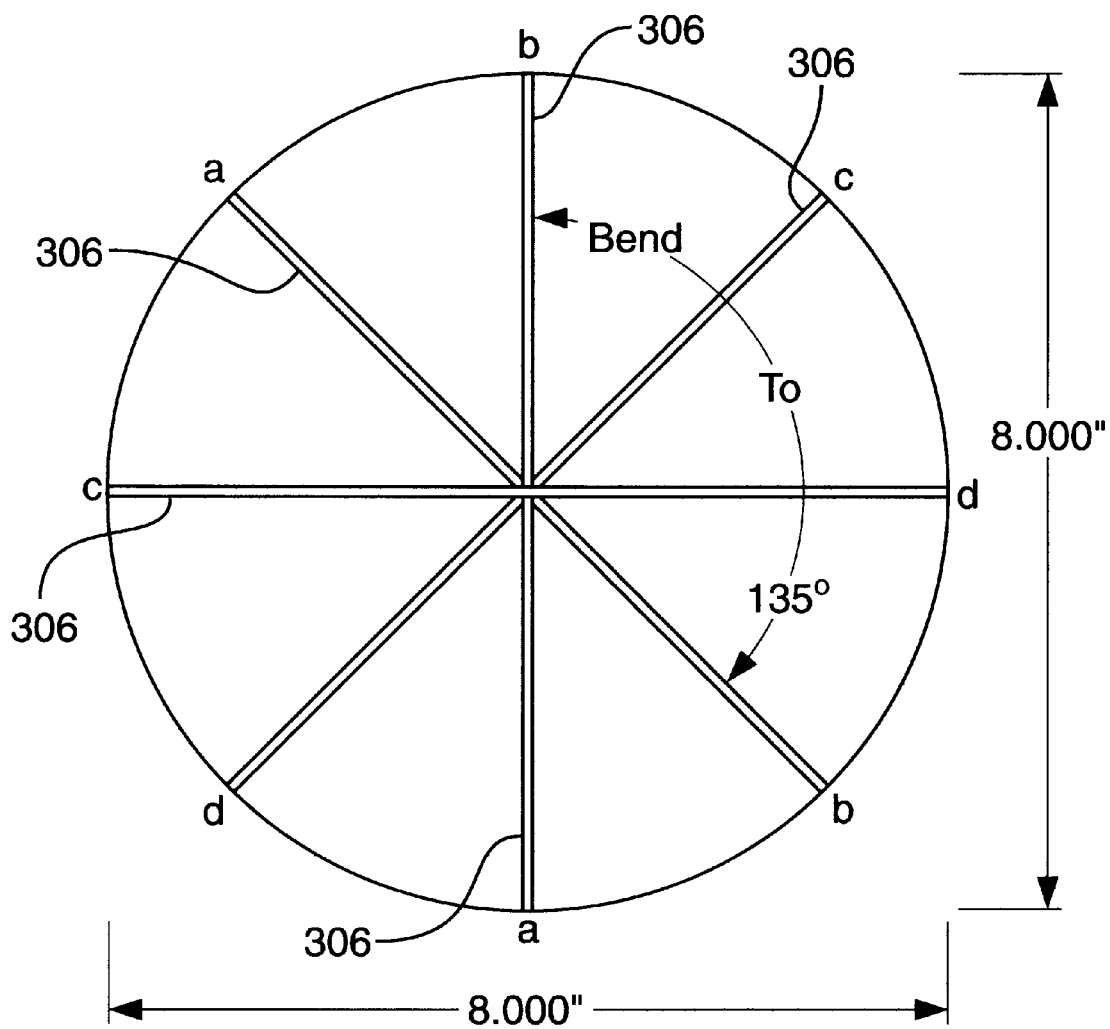
FIG. 3b is a top view of a global raingage orifice comprising a plurality of vanes according to the present invention.
Figure 3C:
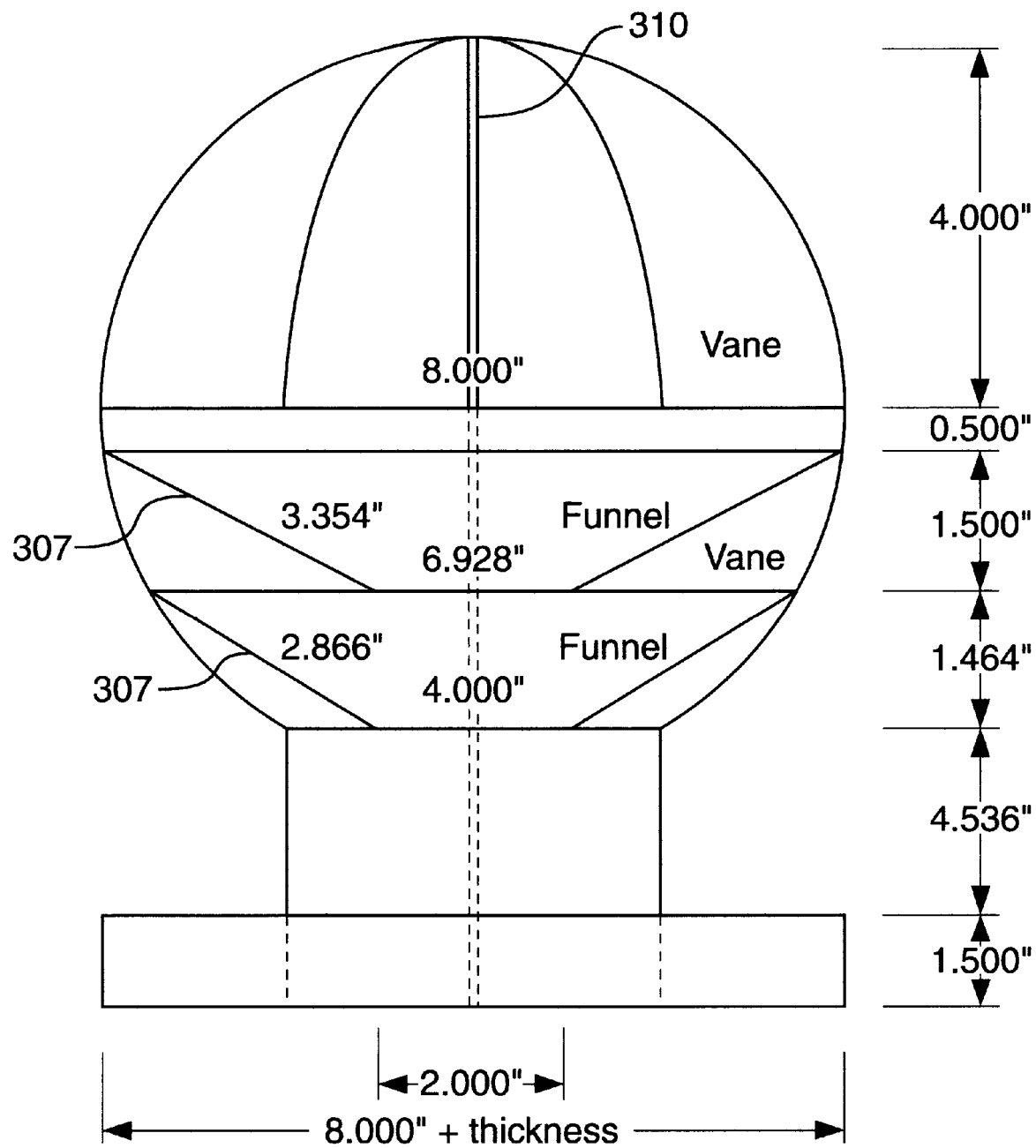
FIG. 3c is a dimensional plan of a global raingage orifice comprising a plurality of vanes according to the present invention.

Referring to FIGS. 3a–3c, a second embodiment of the invention again comprises a spherical orifice 300, a base piece 301 for mounting the orifice 300 on top of a USNWS standard gage, and a vertical cylinder or neck 302 located in-between. This embodiment, however, differs from the first in that the three cylinders in the upper hemisphere of orifice 200 are reduced in number or eliminated entirely, and two additional vanes 306 are added to the configuration.

The upper-half of the orifice 300 consists of the four vanes 306 interlocked together at 45° angles from one another to form a semi-global shape. Thus, the four vanes 306 appear to actually be eight vanes connected along a longitudinal axis 310 of the orifice 300, each disposed 45° from the next, adjacent vane. In the lower hemisphere of the orifice 300, there are two funnels 307 supported by vanes 306' positioned 90° from one another. The two vanes 306' are configured in such a manner as to look like an extension of the vanes 306 located in the upper orifice. Designs of the two funnels 307 in the lower hemisphere are similar to the funnels disclosed in the first embodiment. A side view, top view, dimensional plan and pattern layout of the second illustrative embodiment are given in FIGS. 3a through 3d, respectively.

Figure 4A:
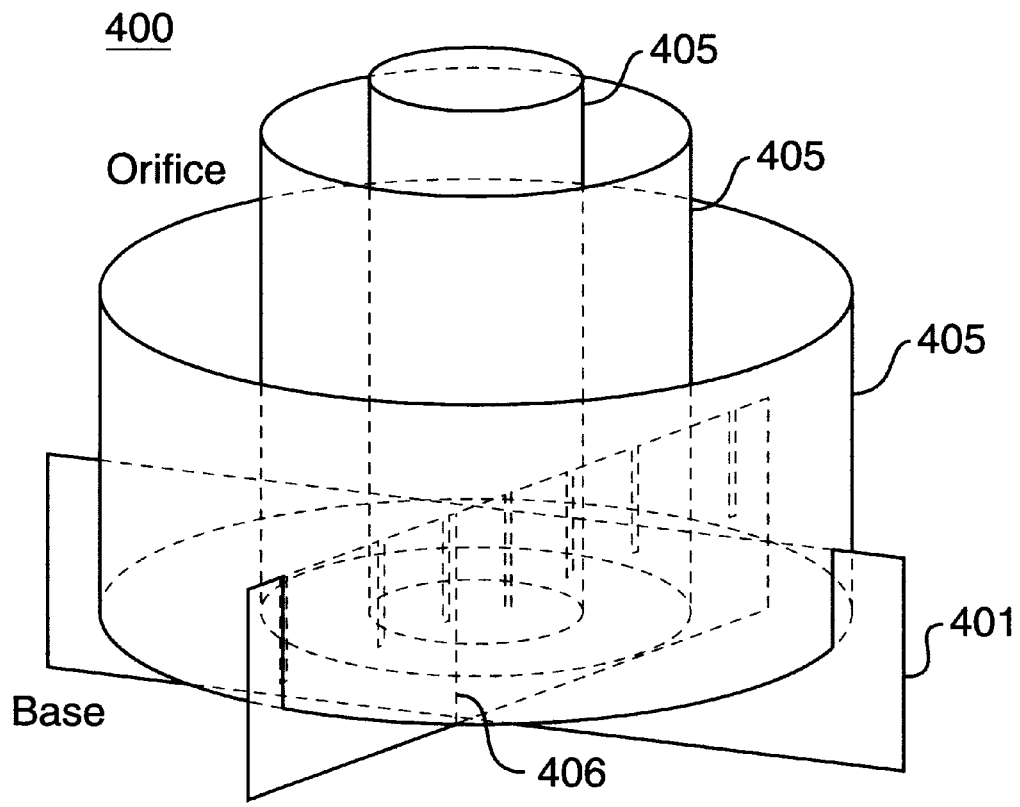
FIG. 4a is a side view of a semi-global raingage orifice comprising a plurality of cylinders according to the present invention.
Figure 4B:
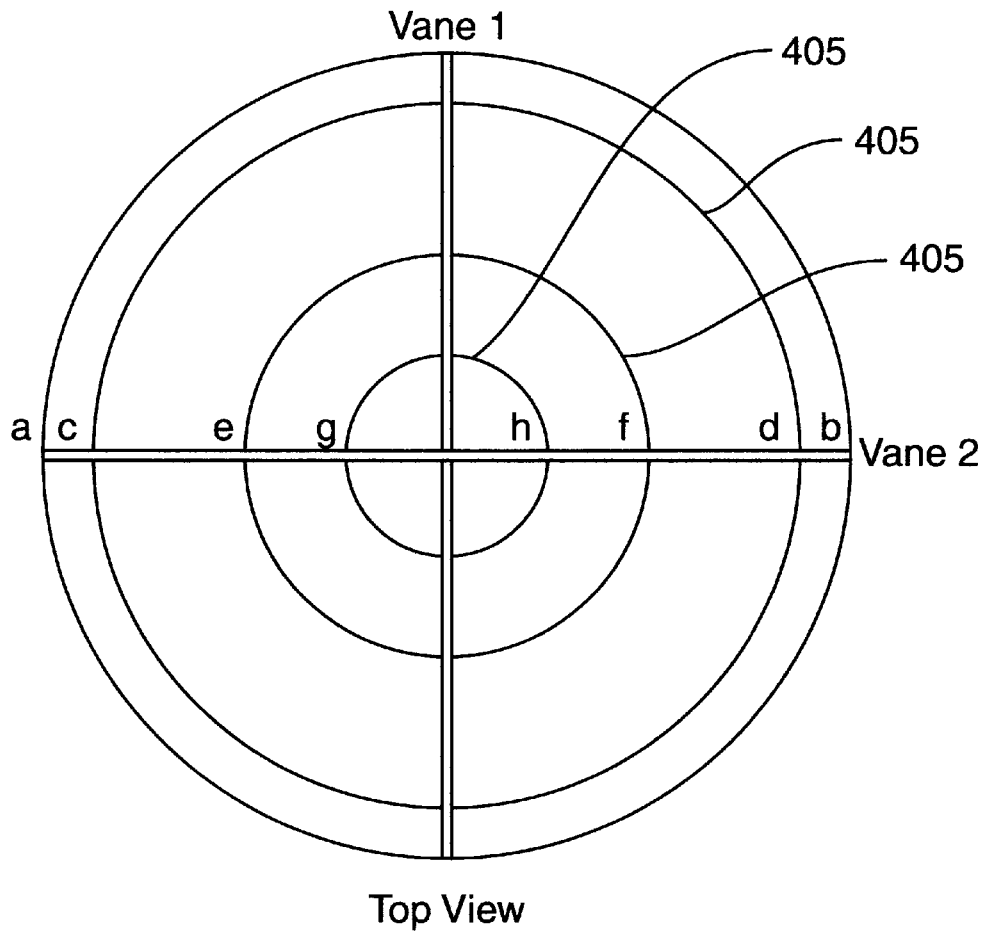
FIG. 4b is a top view of a semi-global raingage orifice comprising a plurality of cylinders according to the present invention.
Figure 4C:
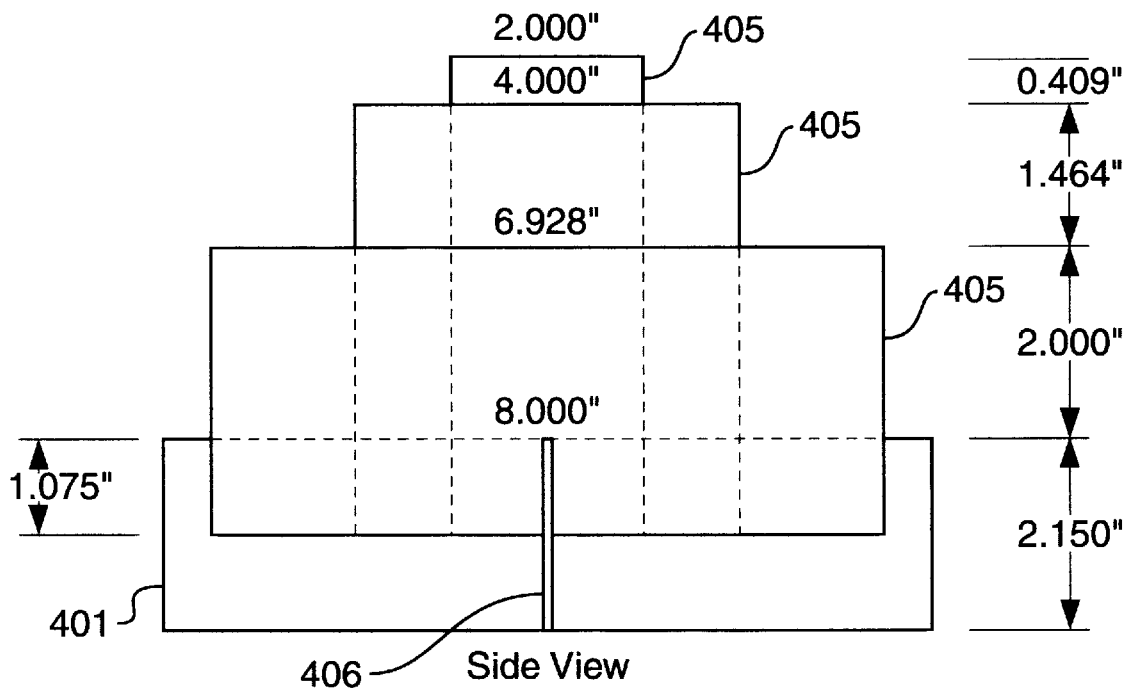
FIG. 4c is a dimensional plan of a semi-global raingage orifice comprising a plurality of cylinders according to the present invention.
Figure 4D:
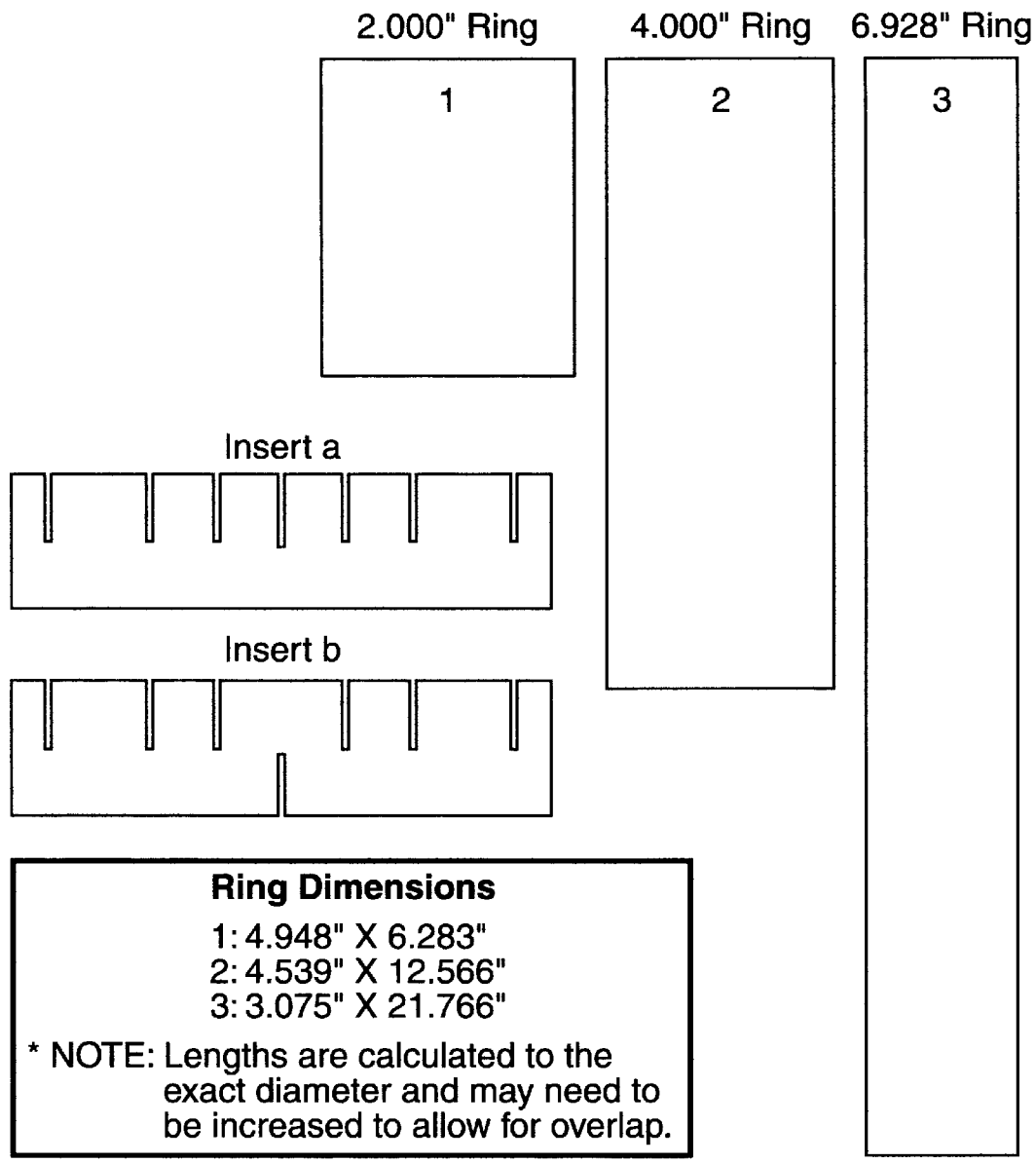
FIG. 4d is a pattern layout of a semi-global raingage orifice comprising a plurality of cylinders according to the present invention.

Referring now to FIGS. 4a and 4b, a still further embodiment of the invention is shown including a plurality of cylinders 405, but wherein the lower hemisphere of the orifice is not used and there are no vertical vanes interlocked therein. The base 401 of this model is about 2.150 inches (5.46 cm) in depth and around 8 inches (20.32 cm) wide. Three vertical vanes 406 are, however, cut into the base to a depth of about 1 inch (2.73 cm) and, in an especially preferred embodiment, are soldered together to form a single, integral piece. When the semi-global orifice is mounted on top of a standard gage, the tops of the three concentric cylinders 405 relative to the bottom plane of the 8 inch (20.32 cm) diameter orifice are around 30, 60, and 72°. See FIGS. 4a through 4d for a side view, top view, dimensional plan, and pattern layout, respectively, of this third embodiment.

Figure 5A:
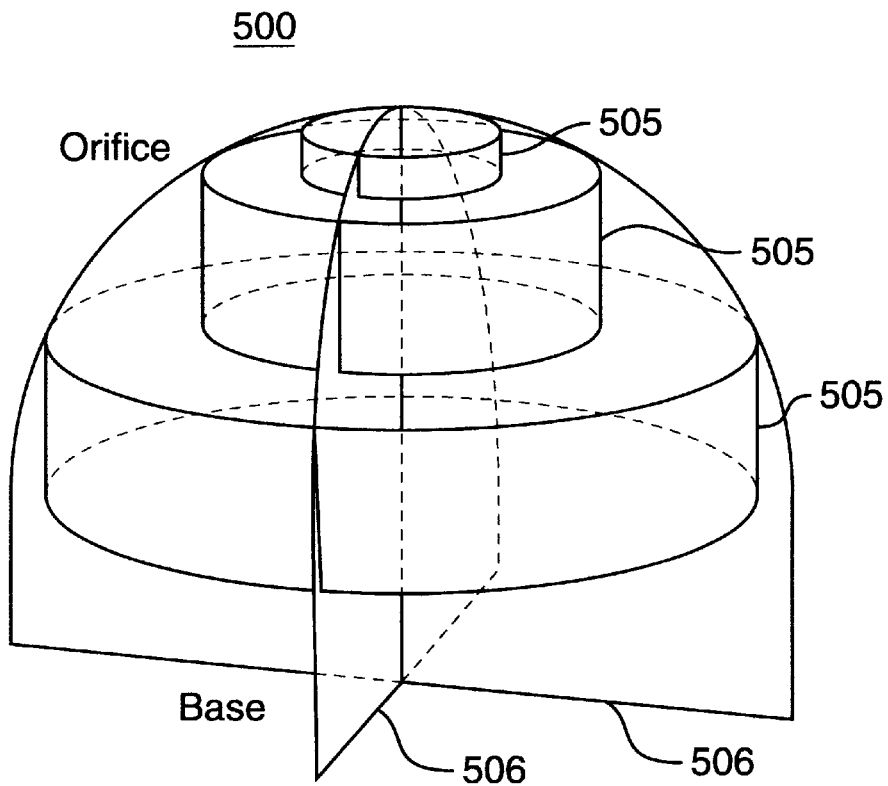
FIG. 5a is a side view of a semi-global raingage orifice comprising a plurality of vanes and cylinders according to the present invention.
Figure 5B:
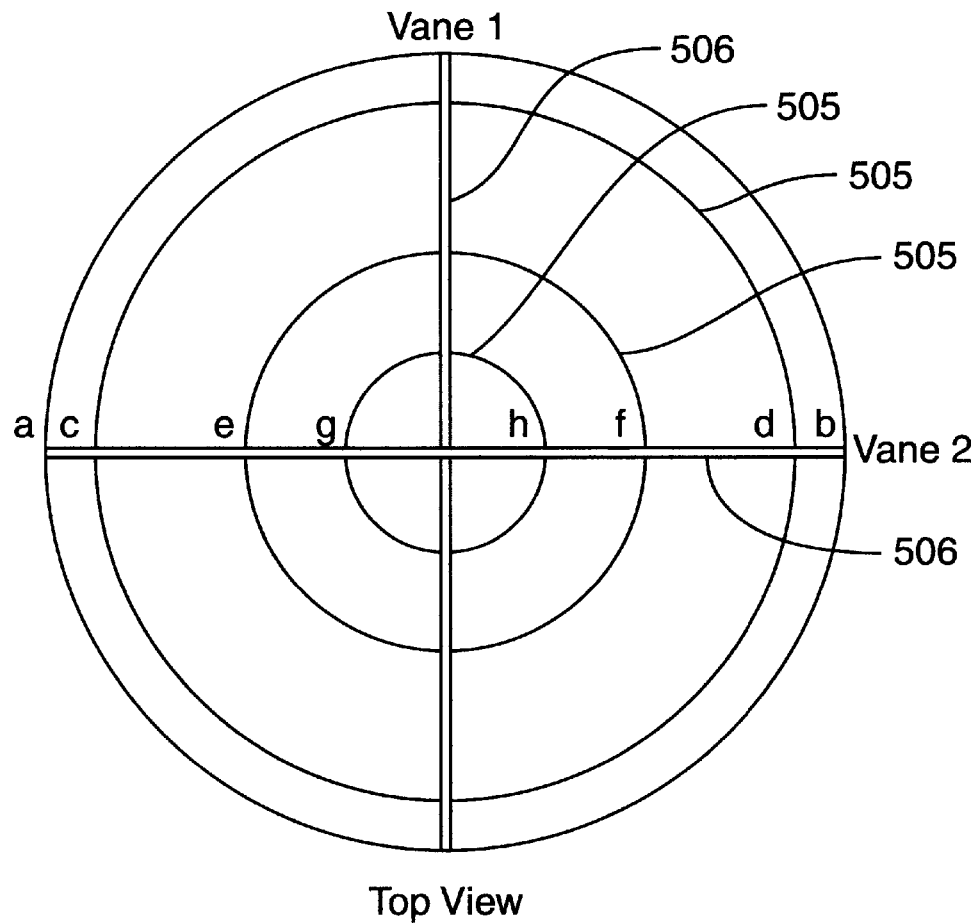
FIG. 5b is a top view of a semi-global raingage orifice comprising a plurality of vanes and cylinders according to the present invention.
Figure 5C:
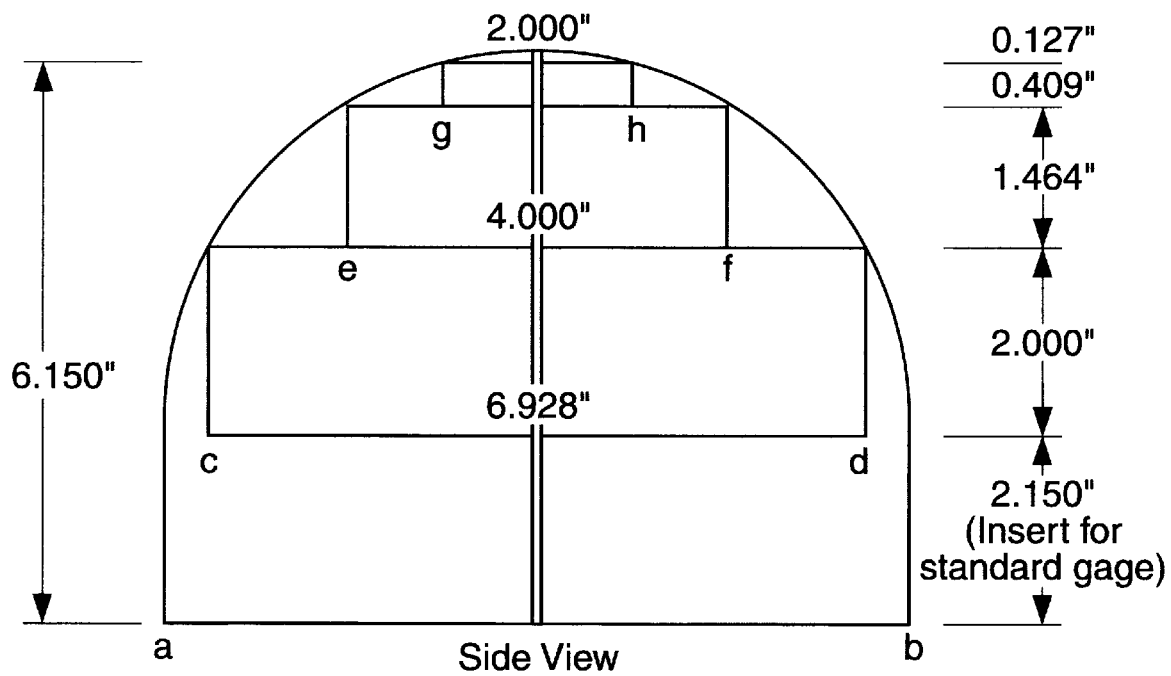
FIG. 5c is a dimensional plan of a semi-global raingage orifice comprising a plurality of vanes and cylinders according to the present invention.
Figure 5D:
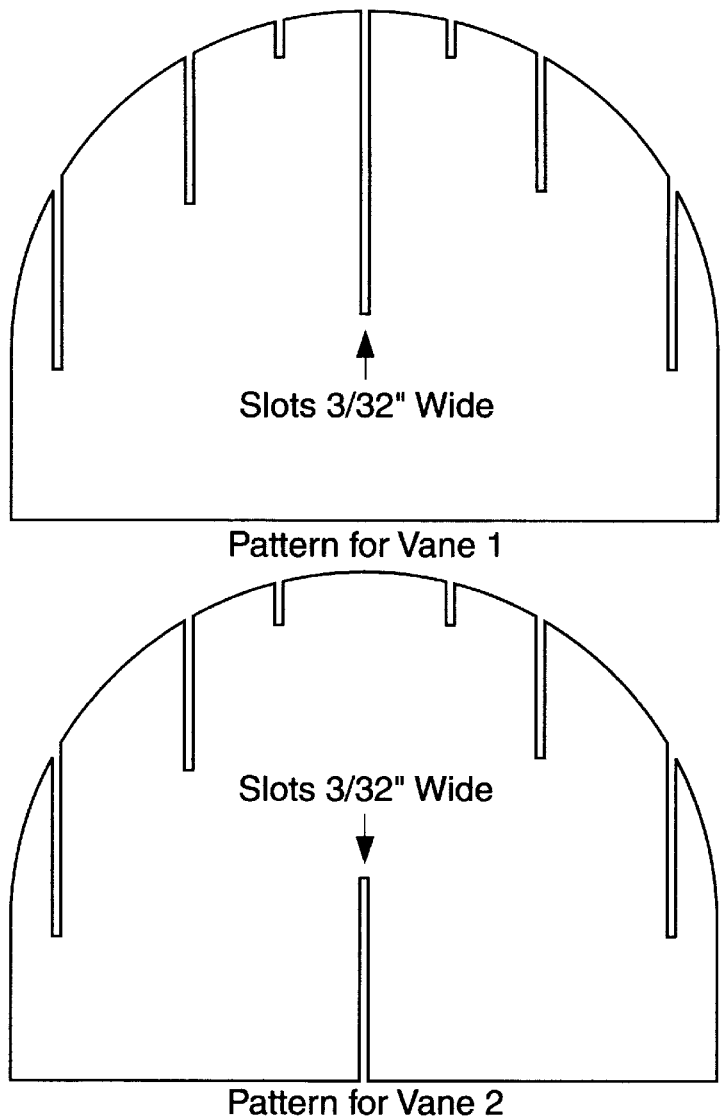
FIG. 5d is a pattern layout of a semi-global raingage orifice comprising a plurality of vanes and cylinders according to the present invention.

Referring now to FIGS. 5a and 5b, a still further embodiment of the invention is shown comprising a plurality of cylinders 505, but again excluding the lower-half of the spherical orifice, and further comprising a pair of vertical vanes 506 in the upper hemisphere extending downward into the gage to a depth of around 2.150 inches (5.46 cm). This is optimally the depth that the semi-global orifice 500 will be inserted into the orifice of a standard gage. When fully inserted into the orifice of the standard gage (not shown), the base of the lowermost cylinder 505 will be level with the orifice rim of the standard gage. A side view, top view, dimensional plan and pattern layout of this fourth embodiment are shown in FIGS. 5a through 5d.

The dimensional plans and pattern layouts of the embodiments discussed above are provided in the indicated figures. As mentioned, the dimensions are calculated to fit the newly invented global and semiglobal receiving orifices to the existing 8 inch standard diameter USNWS raingage widely used in the United States. For an orifice diameter other than 8 inches (20.32 cm), the dimensions should optimally be adapted proportionately.

Each of the proposed embodiments may be constructed of 24 gauge, or heavier, galvanized sheet metal, 40/60 acid core solder wire, and substantially pure silicone. It is suggested that the materials used for constructing these gages be the same as the material employed in standard gages. Materials such as PVC, polyethylene, or others with white or light color can also be used for construction as long as they are strong and have a high flexural rigidity. If chemically induced materials are used, all upper edges of the orifice should be sharpened to avoid splash effects due to the necessary thickness of such materials.

Changes in gage diameter, the type and thickness of materials, arrangements of the vanes and cylinders, and even small hooks to fasten the new orifices to standard raingages can be integrated into the construction described above without departing from the spirit of the present invention. Moreover, while the above description has been set forth with respect to the specific embodiments disclosed herein, those of skill in the art will appreciate that many other variations of a gage having either a global or semi-global orifice, either with or without vanes and/or cylinders, may be realized without departing from the scope or spirit of the present invention.

We claim:

1. A raingage for providing improved measurement of local rainfall, the raingage comprising:
   a spherical catching piece for catching falling precipitation, wherein the spherical catching piece further comprises a plurality of cylinders disposed in an upper hemisphere thereof;
   a base piece for mounting the spherical catching piece on top of an existing orifice of a measuring tube; and
   a neck piece for connecting the spherical catching piece and the base piece together.

2. The raingage of claim 1, wherein the spherical catching piece further comprises a plurality of funnels disposed in a lower hemisphere of the spherical catching piece.

3. The raingage of claim 1, wherein the spherical catching piece further comprises a plurality of support vanes disposed in an upper hemisphere thereof.

4. The raingage of claim 1, wherein the spherical catching piece further comprises a plurality of support vanes and a plurality of funnels.

5. A raingage for providing improved measurement of local rainfall, the raingage comprising:
   a semi-spherical catching piece for catching falling precipitation;
   a base piece for mounting the semi-spherical catching piece on top of an existing orifice of a measuring tube; and
   a neck piece for connecting the semi-spherical catching piece and the base piece together,
   wherein the semi-spherical catching piece further comprises a plurality of concentrically disposed cylinders.

6. The raingage of claim 5, wherein the semi-spherical catching piece further comprises a plurality of support vanes cut into the base piece.

* * * * *